United States Patent
Denz et al.

(10) Patent No.: US 6,758,190 B2
(45) Date of Patent: Jul. 6, 2004

(54) METHOD AND DEVICE FOR CONTROLLING AN OUTPUT VARIABLE OF A DRIVE UNIT IN THE STARTING PHASE

(75) Inventors: Helmut Denz, Stuttgart (DE); Ruediger Weiss, Moetzingen (DE); Achim Guenther, Stuttgart (DE); Christof Thiel, Heilbronn (DE); Werner Hess, Stuttgart (DE); Martin Ludwig, Vaihingen (DE); Armin Hassdenteufel, Sachsenheim-Ochsenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/178,202

(22) Filed: Jun. 24, 2002

(65) Prior Publication Data

US 2002/0195084 A1 Dec. 26, 2002

(30) Foreign Application Priority Data

Jun. 23, 2001 (DE) .......................................... 101 30 360

(51) Int. Cl.$^7$ ............................................. F02D 41/00
(52) U.S. Cl. ............. 123/350; 123/339.19; 123/406.24; 123/406.54; 123/436; 703/51
(58) Field of Search .............................. 123/319, 339.19, 123/350, 352, 405.24, 406.54, 419, 435, 366; 703/1, 51

(56) References Cited

U.S. PATENT DOCUMENTS

| | | | | |
|---|---|---|---|---|
| 5,809,965 A | * | 9/1998 | Atanasyan | 123/339.15 |
| 5,996,552 A | * | 12/1999 | Iijima et al. | 123/339.18 |
| 6,000,376 A | | 12/1999 | Hess et al. | 123/333 |
| 6,275,759 B1 | * | 8/2001 | Nakajima et al. | 701/54 |

FOREIGN PATENT DOCUMENTS

| | | |
|---|---|---|
| DE | 196 18 893 | 12/1999 |
| DE | 199 39 821 | 2/2001 |

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

A method and a device for controlling an output variable of a drive unit in the starting phase is described. A controller is provided, regulating the actual value of at least one output variable to a setpoint variable of this output variable which is specified as a function of time. When at least one condition marking entry into the starting phase exists, the setpoint value of the output variable is initialized with the actual value of the output variable.

23 Claims, 3 Drawing Sheets

METHOD AND DEVICE FOR CONTROLLING AN OUTPUT VARIABLE OF A DRIVE UNIT IN THE STARTING PHASE

FIELD OF THE INVENTION

The present invention relates to a method and a device for controlling an output variable of a drive unit in the starting phase.

BACKGROUND INFORMATION

In the wake of more stringent vehicle emission regulations, there have also been attempts to optimize the starting phase of an internal combustion engine. The starting phase of an engine includes the operating phase from turning the ignition switch to running the engine at a steady-state idling speed. It has been found that there is a correlation between hydrocarbon emissions (untreated HC emissions) and the extent of speed overshoot in the starting phase. Speed overshoot in this connection denotes overshooting of the speed within the starting phase beyond the steady-state idling speed assumed subsequently without actuation of the accelerator pedal by the driver. In general, untreated HC emissions increase with the extent of the speed overshoot. The reason for this increase in untreated HC emissions is the evaporation or breakaway of wall film components of the fuel. This effect is intensified by the drop in manifold pressure and the increase in air flow with a speed overshoot. There is thus a demand for optimization of the starting phase, in particular optimization of the speed characteristic, which should be flat and robust and have minimal overshoot.

It is known from German Published Patent Application No. 199 39 821 that during the starting phase of an engine, at least one parameter of an idling speed controller may be adapted specifically to the conditions of the starting phase. It is proposed in particular that when the steady-state speed setpoint to be maintained subsequently is exceeded due to manipulation of the firing angle, the speed overshoot be limited by manipulating the firing angle, the firing angle intervention being based on a parameter of the idling speed controller provided specifically for the starting phase. This procedure yields an effective reduction in speed overshoot, but it has the potential for further optimization with regard to untreated HC emission.

German Patent Published Application No. 196 18 893 (U.S. Pat. No. 6,000,376) describes a torque-based engine control in which a torque setpoint is determined for adjusting the filling (air supply) to the engine on the basis of a predetermined torque setpoint derived from the deflection of the accelerator pedal or predetermined by other control systems. At least one additional torque setpoint is determined and implemented for adjustment via a more rapid control parameter of the engine, such as the firing angle or the fuel supply. This permits independent control of filling and the rapid torque intervention path under certain operating situations.

SUMMARY OF THE INVENTION

Through regulation of the starting phase on the basis of a time-dependent setpoint curve, a speed overshoot may be omitted or specified in a defined manner without any sacrifice of reliability in starting. In the case of an increased friction moment in startup, the regulation, preferably the idling controller, will detect this on the basis of the deviation between the actual variable and the specified variable and will bring the actual variable closer to the specified variable. The startability of the engine may thus be ensured even under difficult conditions.

By specifying the time characteristic of at least one output variable (e.g., torque, power, speed) of the drive unit in the starting phase, which is started with an actual value of the output variable, when at least one condition is present one achieves the result that the actual variable matches the specified variable when this condition is met. This prevents intervention into a manipulated variable for influencing the output variable. Therefore, operation of the engine during the starting phase may be optimal. This is also true of the remaining ramping-up curve of the speed, because in principle the deviations between the specified value and the actual value of the output variable are also much smaller in this phase, and thus much smaller actuating interventions may be necessary to maintain the specified time characteristic.

Due to the elimination of or definite reduction in the speed overshoot, a startup having lower untreated HC emissions may be guaranteed.

Due to the time-dependent specification of the characteristic of the output variable, integration into a torque-based control structure is possible without any interfering actuating interventions in startup. This regulating method may be especially effective when the controller intervention is implemented via the firing angle of the engine.

DETAILED DESCRIPTION

Figure 1:
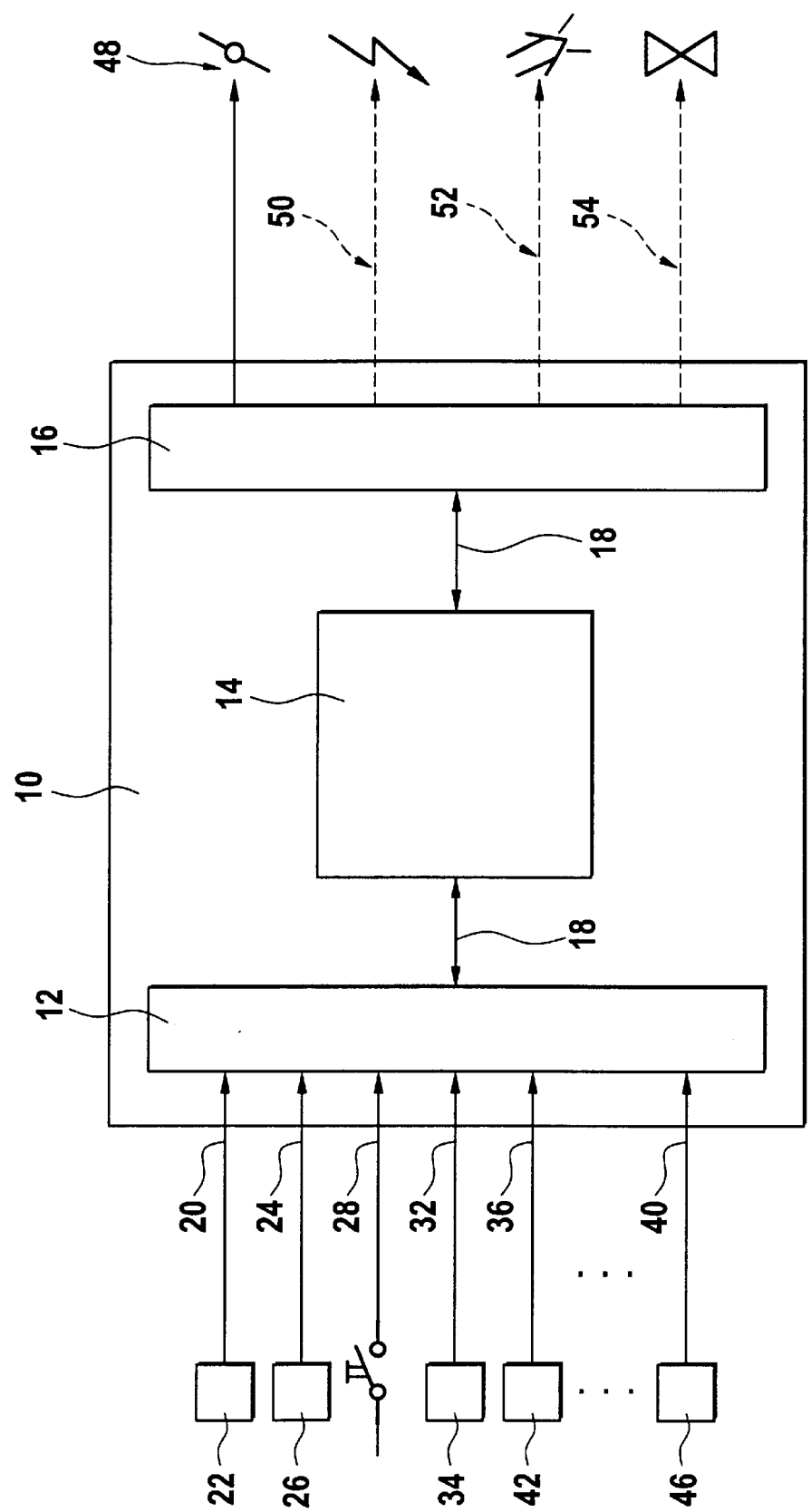
FIG. 1 shows a survey diagram of a control unit for controlling a drive unit.

FIG. 1 shows an electronic control unit 10 which has at least one input circuit 12, at least one computer unit (plus memory) 14 and at least output circuit 16. Input circuit 12, computer unit 14 and output circuit 16 are interlinked by a communication system 18 for mutual data exchange. At least the following input lines lead to input circuit 12 in the preferred embodiment: an input line 20 from a measurement device 22 for detecting a measured variable for the accelerator pedal position (wped), an input line 24 from a measurement unit 26 for detecting a measured variable for the temperature of the drive unit (tmot), an input line 28 which carries a signal to input circuit 12 when the ignition switch is closed, and an input line 32 from a measurement device 34 for detecting a measured variable for the engine speed (nmot). Furthermore, there are also input lines 36 through 40 of measuring devices 42 through 46 which measure additional operating variables of the drive unit or the vehicle which are needed for performing functions that are implemented by control unit 10, e.g., in the case of an engine control, the intake air temperature, the air mass supplied, the exhaust gas composition, etc. Via output circuit 16, electronic control unit 10 controls actuating elements according to the measured quantities detected. In an exemplary embodiment, the filling of the engine is controlled by influencing the air supply to the engine via a throttle valve 48, and ignition time 50 is also set, fuel metering 52 is influenced and/or a turbocharger 54 is controlled.

Outside the starting phase, for example, a torque setpoint is specified as a function of the accelerator pedal position or an external control system, this torque setpoint being adjusted to control the filling and additionally by controlling at least one additional manipulated variable, e.g., the firing angle. In some operating states, e.g., in idling mode, the torque setpoint which is adjusted via the filling may be different from the torque setpoint adjusted via the firing angle. This suggests the possibility of also building up torque via the firing angle, particularly in idling mode. Furthermore, an idling speed controller is provided, which implements a manipulated variable intervention, preferably a firing angle intervention, according to the controller structure that has been implemented, as a function of the deviation between the speed setpoint and the actual speed. The speed controller includes a proportional component, a differential component and optionally also an integral component.

During the starting phase, i.e., after turning over the engine until it is stabilized at a steady-state speed, the speed is regulated according to a predetermined speed characteristic over time, with the involvement of a controller, possibly the idling controller. Furthermore, to adjust the torque structure, a torque characteristic is specified in the starting phase and used as the torque setpoint for the firing angle setting. Filling is controlled in this phase according to a fixed post-starting torque setpoint, i.e., the torque setpoint which should prevail after conclusion of the starting phase.

Speed setpoint nsoll is specified as a time-dependent characteristic for the controller on exceeding a specified engine speed threshold NLLREIN, which indicates the transition from the ignition phase to the starting phase and corresponds to approx. 500 rpm, for example.

This speed setpoint characteristic is initialized with instantaneous engine speed nmot at time t0, i.e., on exceeding threshold value NLLREIN. The speed characteristic is specified so that it tends toward steady-state speed setpoint nstat as the end value; this is the speed which is to be assumed by the engine after conclusion of the starting phase.

The specified speed setpoint characteristic follows a specified timing function. In the simplest case, this is an exponential function having a predetermined time constant T which corresponds approximately to the following formula:

$$nsoll\ (t-t0) = nstat + (nmot\ (t0) - nstat) * \exp(-(t-t0)/T)$$

An exemplary extension in preselection of the speed characteristic is when an artificial overshoot is specified as a function of starting temperature. Thus a speed overshoot is specified at low temperatures to increase reliability in starting. Despite the speed overshoot, there is a smooth stabilization of engine speed at steady-state end value nstat like in the case of a specified speed characteristic without overshooting. Overshooting is specified as described on the basis of FIG. 3, for example.

As explained above, the time-dependent specification of the speed setpoint begins when a specified speed threshold which describes the end of the starting phase is exceeded. The time-dependent setpoint specification ends on reaching another speed threshold, which is derived from the steady-state speed setpoint to be established and describes reaching a speed range around this steady-state speed setpoint. Once this second speed threshold has been reached, the steady-state speed setpoint is specified instead of the time-dependent speed setpoint. Engine speed thresholds for delimiting the starting phase depend on other operating variables such as engine temperature in preferred embodiments. In addition, torque threshold values are used instead of the engine speed in other exemplary applications.

On entering the starting phase, i.e., in an exemplary embodiment on exceeding the first speed threshold, the controller, which may be identical to an idling controller, is enabled for the starting phase. Since greater system deviations are to be expected in ramping up the speed in the starting phase than in the steady-state phase, a separate set of parameters is provided for the idling controller for the starting phase. After concluding the ramp-up of speed, i.e., on exceeding the second speed threshold, the system is switched to the normal set of parameters for idling regulation. In other exemplary embodiments, there are two different controllers, the first controller being enabled for the starting phase, the second controller (the idling controller) being enabled after the end of ramp-up of the speed.

If the idling controller is used as the controller during the starting phase, it acts primarily on the firing angle as a manipulated variable, so that deviations between the setpoint and actual value are smoothed out rapidly without the filling component of the idling controller having to perform a manipulation of filling.

The speed regulation in the starting phase described above is tied into the torque control of the torque-oriented engine control. As part of this torque structure, a post-starting torque setpoint mimin is output as the torque setpoint for the filling path. This torque setpoint is adjusted by converting it to a setpoint filling value and subsequently converting it to a setpoint throttle valve value. During the ignition phase, the engine is unthrottled, i.e., the throttle valve is opened completely to ensure an adequate supply of air to the engine. This procedure results in a difference in the starting phase between the actual filling and the setpoint filling calculated from the torque setpoint. Therefore, the actual torque calculated on the basis of the actual filling is greater than the torque setpoint specified for the filling path. In the normal case, the firing angle would respond to this by a retard to set the lower torque setpoint. However, this is counterproductive from the standpoint of ramping up the speed. Thus, to optimize the starting phase, in contrast with the filling path, in the firing angle path it is not the fixed post-starting torque setpoint which is specified but instead a time-dependent torque setpoint characteristic mistn. This modeled setpoint is initialized at time t0, i.e., on exceeding threshold value NLLREIN with the value of actual torque mibas (t0) calculated then. This setpoint is then regulated down to minimum post-starting torque setpoint mimin as a function of time. This down-regulation takes place according to a timing function which corresponds to an exponential function in the simplest case according to the specified setpoint:

$$mistn(t-t0) = mimin + (mibas(t0) - mimin) * \exp(-(t-t0)/T)$$

If time constant T of this timing function is selected so that the torque setpoint in the starting phase always corresponds to the actual torque, then no firing angle intervention is triggered. However, it is advantageously possible to set a defined torque deviation between the torque setpoint and the actual torque due to a more rapid reduction in the starting torque in comparison with the reduction in actual torque, and thus achieve a precontrol of the firing angle in the direction of retarded values. This expands the reserve in the firing angle to act in the sense of increasing torque through an early adjustment.

The output variable of the controller and the specified torque setpoint are linked, and the firing angle is controlled as a function of this value, which is formed by addition, for example. The speed controller thus has an undisturbed influence on the firing angle.

If modeled starting torque mistn exceeds setpoint misoll specified by the driver while the speed is being ramped up, then the greater torque is relayed for the firing angle setting as part of a maximum value selection, i.e., in this case the torque setpoint specified by the driver is relayed. This may ensure that in the case of an elevated torque request in starting, e.g., by operation of the accelerator pedal by the driver, this increased torque request is taken into account correctly.

The use of an exponential function for time-dependent control is mentioned only as an exemplary example. In other embodiments, other time-dependent functions are used or time-dependent increments are used. Furthermore, depending on the embodiment, speed control and torque control are used together, or one is used alone without the other.

In an exemplary embodiment, the procedure described above is implemented as a computer program in microcomputer 14 of control unit 10. The structure of such a computer program is outlined below on the basis of the flow chart in FIG. 2.

Figure 2:
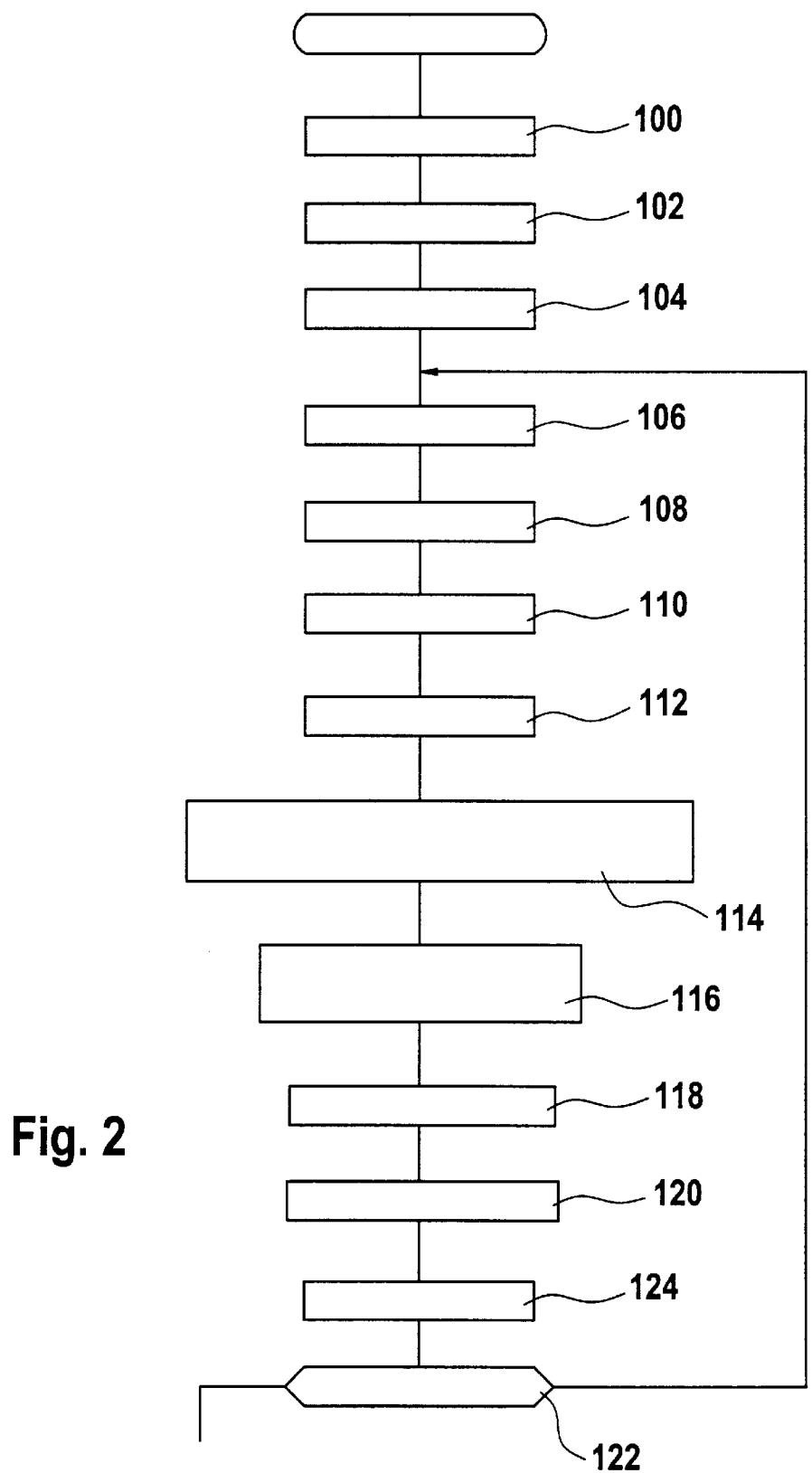
FIG. 2 shows the procedure for startup regulation on the basis of a flow chart.

The program outlined on the basis of the flow chart in FIG. 2 starts when the engine speed exceeds a specified speed threshold NLLREIN, which optionally depends on operating variables. In an exemplary embodiment presented here, a speed characteristic and a torque characteristic which do not result in speed overshooting and do not set a defined torque deviation are specified.

In first step 100, speed setpoint nsoll is initialized with instantaneous engine speed nmot. Then in step 102 an instantaneous torque mibas is input, either having been measured via appropriate sensors or estimated on the basis of operating variables such as the air mass supplied and the engine speed. In step 104, starting torque setpoint mistn intended for the starting phase is set at the value of actual torque mibas input in step 102. In a following step 106, torque setpoint misoll is input; this torque setpoint is formed primarily as a function of the operation of the accelerator pedal by the driver, or is optionally specified by external systems. In the next step 108, torque setpoint mimin is input for the post-starting phase. This torque setpoint is specified and results in closing of the throttle valve starting from the unthrottled, i.e., open position in the starting phase. In a subsequent step 110, the control deviation between speed setpoint nsoll and instantaneous engine speed nmot is formed and sent to the speed controller, possibly the idling speed controller, which calculates a controller output value dmllr as a function of deviation Δ according to step 112 in accordance with the regulation strategy implemented, e.g., as part of a proportional differential regulation. In the next step 114, the torque setpoint for firing angle path mizwsol is formed from the maximum value of the torque setpoint of starting phase mistn and torque setpoint misoll plus controller output value dmllr of the speed controller which was calculated in step 112. Furthermore, post-starting torque setpoint mimin is specified as setpoint misol_1 for the filling path. In the next step 116, firing angle fa is then set as a function of firing angle setpoint mizwsol and actual torque mibas and throttle valve setting a according to torque setpoint misol_1. The procedures for setting the firing angle and throttle valve position are discussed in the related art. In the next step 118, speed setpoint value nsoll is increased according to the specified timing function, namely by a time-dependent factor A in the example shown here. A similar procedure is followed according to step 120 for torque setpoint mistn in the starting phase, which is reduced according to a specified timing function. In the example shown in step 120, the mistn value is reduced by a time-dependent factor Δ with each program run. Then in step 124, instantaneous engine speed nmot is input and in step 122 it is compared with a threshold value which determines the end of the starting phase. This threshold value is formed by the steady-state speed nstat specified after the start and a tolerance value Δ. If the engine speed exceeds this threshold value, the starting phase is regarded as concluded and the program illustrated in FIG. 2 is terminated. In this case, the idling controller no longer receives the time-dependent speed setpoint but instead it receives the steady-state speed setpoint. If the speed setpoint has not exceeded the speed threshold, the system is still in the starting phase. In this case the program is repeated with step 106 on the basis of the speed detected in step 124.

Figure 3:
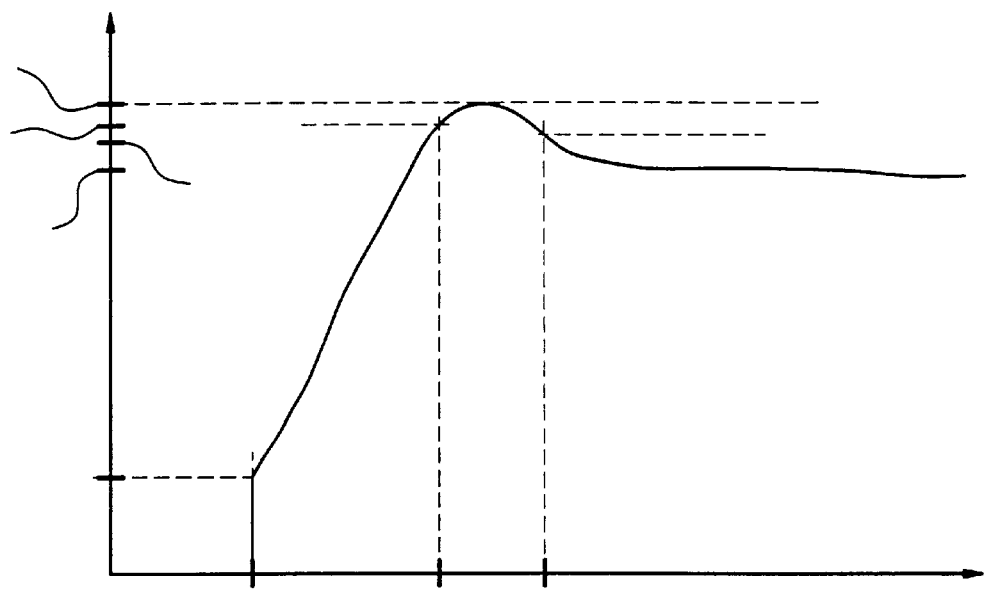
FIG. 3 is a first example of time characteristics of selected operating variable signals and specified signals based on an exemplary embodiment.
Figure 4:
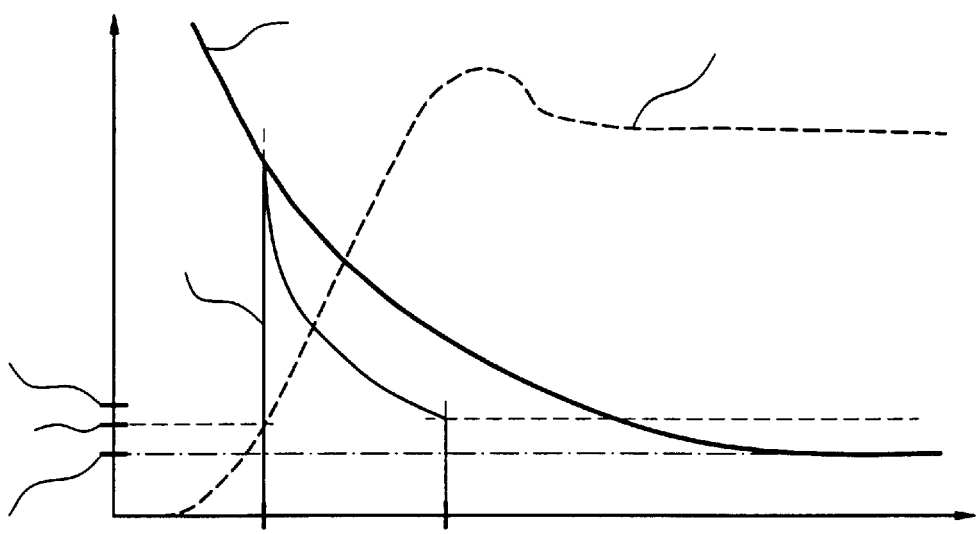
FIG. 4 is a second example of time characteristics of selected operating variable signals and specified signals based on an exemplary embodiment.

FIGS. 3 and 4 show time diagrams illustrating the characteristics of the speed setpoint (FIG. 3), the actual speed and the torque variables (FIG. 4) in another exemplary embodiment in which speed overshooting has been set and a defined torque deviation has been specified. FIG. 3 shows the characteristic of speed setpoint nsoll plotted as a function of time on a typical example, while FIG. 4 shows the characteristic of the actual speed (broken lines), the actual torque and starting torque mistn over time.

At time t0, the engine speed exceeds threshold value NLLREIN. Therefore, as illustrated in FIG. 3, speed setpoint nsoll is initialized with the instantaneous engine speed. Then the speed setpoint of a specified timing function is increased as a function of time with a predetermined time constant. The timing function here is specified an end value (nsolst, optionally depending on temperature), which is greater than the steady-state speed setpoint. Before time t0, the speed setpoint assumes a specified value, e.g., steady-state speed nstat. However, this is not regulated because no controller is active before time t0. If the speed reaches threshold value Δ1 at time t1, then instead of starting setpoint value nsolst, which forms the basis of the calculation of the timing function in phase t0 through t1, steady-state setpoint value nstat to be assumed after starting is specified as the end value for the timing function. This is reached as part of a specified timing function, the calculation using a first time constant in a range between t1 and t2 and a second time constant in the range after t2. The speed setpoint characteristic specified in this way is set by comparison with the actual speed by variation of the firing angle. Switching from range [t1; t2] to range t>t2 is accomplished via a threshold value comparison Δ2.

FIG. 4 shows with broken lines a characteristic of engine speed nmot in starting and the characteristic of actual torque mibas. The latter is determined by the fact that during the ignition phase until time t0, the engine is operated unthrottled, i.e., with the throttle valve opened, and then the filling is reduced to specified torque mimin. If at time t0, the engine speed exceeds a specified threshold value which is identical to threshold value NLLREIN but deviates from this value in other embodiments, then starting torque mistn, which is preselected in the starting phase, is initialized with the actual torque mibas measured at that time. Then the starting torque is reduced, following a given timing function, and in the example illustrated in FIG. 4, a defined torque deviation from the firing angle precontrol is generated between the actual torque and the starting torque through an appropriate choice of the time constant of down-regulation over time. At time t1, starting torque mistn drops below a specified threshold value, which results in the starting torque being reset and the firing angle being adjusted according to post-starting torque mimin. Threshold value mΔ is derived from the minimum torque value.

In the example described above, the engine speed and torque of an internal combustion engine are presented as the output variables to be controlled. In other embodiments other output variables, e.g., engine power, output torque, speed in the drive train of the vehicle, etc. are specified and regulated.

What is claimed is:

1. A method of controlling an output variable of a drive unit during a starting phase of the drive unit before the drive unit is stabilized at a steady-state speed, comprising:

influencing by a controller at least one output variable of the drive unit according to a specified value of the at least one output variable and an actual value of the at least one output variable, the controller being active during the starting phase;

wherein the specified value includes a specified time characteristic during the starting phase.

2. The method according to claim 1, further comprising initializing a system with the actual value when at least one predetermined condition exists.

3. The method according to claim 2, wherein the at least one predetermined condition includes exceeding the actual value.

4. The method according to claim 1, wherein the at least one output variable includes one of a speed of the drive unit and a torque of the drive unit.

5. The method according to claim 1, further comprising specifying the specified value in the starting phase using a time-dependent function.

6. The method according to claim 1, further comprising specifying by a speed controller a control action for adjusting a firing angle of the drive unit as a function of a speed setpoint and an actual speed.

7. The method according to claim 1, further comprising specifying a setpoint output-variable characteristic so that a speed in the starting phase is not overshot.

8. The method according to claim 1, wherein a timing function of at least one setpoint output variable includes an exponential function.

9. The method according to claim 1, further comprising specifying, as a function of one of a driver's intent and at least one other variable, a torque setpoint during the starting phase if the torque setpoint exceeds a starting torque.

10. The method according to claim 3, wherein the actual value depends on a plurality of operating variables.

11. The method according to claim 1, further comprising initializing a system with the actual value when at least one predetermined condition exists.

12. The method according to claim 11, wherein the at least one predetermined condition includes exceeding the actual value.

13. The method according to claim 1, wherein the at least one output variable includes one of a speed of the drive unit and a torque of the drive unit.

14. The method according to claim 1, further comprising specifying the specified value in the starting phase using a time-dependent function.

15. The method according to claim 1, further comprising specifying by a speed controller a control action for adjusting a firing angle of the drive unit as a function of a speed setpoint and an actual speed.

16. The method according to claim 1, further comprising specifying a setpoint output-variable characteristic so that a speed in the starting phase is not overshot.

17. The method according to claim 1, wherein a timing function of at least one setpoint output variable includes an exponential function.

18. The method according to claim 12, wherein the actual value depends on a plurality of operating variables.

19. A method of controlling an output variable of a drive unit during a starting phase of the drive unit before the drive unit is stabilized at a steady-state speed, comprising:

influencing by a controller at least one output variable of the drive unit according to a specified value of the at least one output variable and an actual value of the at least one output variable, the controller being active during the starting phase;

wherein the specified value includes a specified time characteristic during the starting phase; and wherein a specified time-dependent, speed setpoint characteristic tends to a higher value for a target value then a steady-state speed setpoint after starting; and wherein a system switches to the steady-state speed setpoint when at least one predetermined condition exists.

20. The method according to claim 19, wherein the at least one predetermined condition exists when a speed threshold value close to the target value is exceeded.

21. A method of controlling an output variable of a drive unit during a starting phase of the drive unit before the drive unit is stabilized at a steady-state speed, comprising:

influencing by a controller at least one output variable of the drive unit according to a specified value of the at least one output variable and an actual value of the at least one output variable, the controller being active during the starting phase;

specifying a time characteristic of a torque setpoint in the starting phase;

analyzing the torque setpoint to adjust a firing angle path; and specifying another torque setpoint value in the starting phase for a filling;

wherein the specified value includes the specified time characteristic during the starting phase.

22. The method according to claim 21, further comprising specifying, as a function of one of a driver's intent and at least one other variable, the torque setpoint during the starting phase if the torque setpoint exceeds a starting torque.

23. A device for controlling an output variable of a drive unit during a starting phase of the drive unit before the drive unit is stabilized at a steady-state speed, comprising:

a controller for receiving during the starting phase a specified value of at least one output variable and an actual value of the at least one output variable, the controller generating a manipulated variable as a function of the specified value and the actual value, the manipulated variable approaching the actual value; and an arrangement for including a specified time characteristic in a setpoint variable of the at least one output variable during the starting phase.

* * * * *